US006447148B1

(12) United States Patent
Oikawa et al.

(10) Patent No.: US 6,447,148 B1
(45) Date of Patent: Sep. 10, 2002

(54) REFLECTING MIRROR MANUFACTURE METHOD AND LAMP ASSEMBLY

(75) Inventors: Toshihiro Oikawa, Kanagawa; Takuya Kushimoto, Yokohama; Yasushi Yatsuda, Yokohama; Ryotaro Owada, Yokohama; Teruo Koike, Chigasaki; Kouji Ohe, Yokohama; Masahiro Hosaka, Kawasaki, all of (JP)

(73) Assignee: Stanley Electric Co., Ltd., Tokyo (JP)

( * ) Notice: Subject to any disclaimer, the term of this patent is extended or adjusted under 35 U.S.C. 154(b) by 0 days.

(21) Appl. No.: 09/542,328

(22) Filed: Apr. 4, 2000

(30) Foreign Application Priority Data

Apr. 6, 1999 (JP) .......................................... 11-098626

(51) Int. Cl.[7] .................................................. G02B 5/08

(52) U.S. Cl. ....................... 362/347; 362/518; 362/297; 362/346; 359/869; 359/868; 359/867; 359/900

(58) Field of Search ................................ 362/518, 297, 362/346, 347; 359/867, 869, 868, 900

(56) References Cited

U.S. PATENT DOCUMENTS

| | | | | |
|---|---|---|---|---|
| 5,096,281 A | * | 3/1992 | Windebank et al. | 359/868 |
| 5,408,363 A | * | 4/1995 | Kano | 359/869 |
| 5,471,408 A | * | 11/1995 | Takamoto et al. | 364/578 |
| 5,481,408 A | | 1/1996 | Shimada | |
| 5,836,668 A | * | 11/1998 | Ishikawa et al. | 362/61 |
| 5,961,206 A | | 10/1999 | Eichler | |
| 6,024,473 A | | 2/2000 | Fadel | |

FOREIGN PATENT DOCUMENTS

| | | |
|---|---|---|
| FR | 2 744 199 | 8/1997 |
| FR | 2 760 067 | 8/1998 |
| JP | 62-193002 | 8/1987 |
| JP | 4-253101 | 9/1992 |
| JP | 9-82106 | 3/1997 |
| JP | 9-306220 | 11/1997 |

* cited by examiner

*Primary Examiner*—Sandra O'Shea
*Assistant Examiner*—Anabel Ton
(74) *Attorney, Agent, or Firm*—Frishauf, Holtz, Goodman & Chick, P.C.

(57) ABSTRACT

Light distribution characteristics are defined which define a correspondence relation between the position of a reflection point on a reference plane and the position of an image of a light source. In accordance with the light distribution characteristics, a path line in the reference plane is determined. A profile curve for each of a plurality of sampling points dispersibly distributed on the path line, is determined in accordance with the light distribution characteristics, the profile curve passing through the sampling point and corresponding to the topological shape of a reflecting surface to be determined. As the reflection point moves along the profile curve, the image of the light source moves in the direction crossing the reference plane in accordance with the light distribution characteristics. The topological shape of the reflecting surface is determined in accordance with the profile curve determined for each sampling point.

12 Claims, 14 Drawing Sheets

REFLECTING MIRROR MANUFACTURE METHOD AND LAMP ASSEMBLY

This application is based on Japanese Patent Application HEI 11-98626, filed on Apr. 6, 1999, the entire contents of which are incorporated herein by reference.

BACKGROUND OF THE INVENTION a) Field of the Invention

The present invention relates to a reflecting mirror manufacture method and a lamp assembly, and more particularly to a method of manufacturing a reflecting mirror for reflecting light radiated from a light source to desired directions and illuminating a front space, and to a lamp assembly using such a reflecting mirror.

b) Description of the Related Art

For designing the light distribution of a vehicle front lamp, it is essential not only to form a predetermined light distribution but also to realize a sufficient illuminance in the central area of the front space and uniform diffusion of light in a horizontal direction. These requirements can be met generally by disposing a front lens and by controlling the reflection or the refraction direction of light radiated from a light source by changing the topological shape of a reflecting mirror surface.

The recent main trend of vehicle front lamps is to obtain desired light distribution characteristics only from the functions of a reflecting mirror surface. In this case, it is necessary to design the topological shape of a reflecting mirror surface so as to satisfy all light distribution requirements such as a central area illuminance and light diffusion.

An invention which obtains desired light distribution characteristics from the functions of a reflecting mirror surface is disclosed in the publication of JP-A-62-193002. According to this invention, desired light distribution characteristics are obtained by a composite reflecting surface formed by disposing in a horizontal direction a plurality of reflecting areas each having a vertically long rectangular shape with a vertical cross section of a parabola and a horizontal cross section of a particular curve. Since each reflecting surface of the vertically long rectangular shape has a parabola plane of a different shape, definite borderlines appear between the reflecting surfaces.

A lamp assembly using such a reflecting mirror has a variation in illuminance caused by the borderlines even if each reflecting surface is designed to have desired light distribution characteristics. Light reflected from a borderline becomes glare illumination light. Drivers of the vehicle and a vehicle running on the opposite lane may feel uncomfortable.

Another approach has been used in some cases in order to improve the uniformity and the like of light distribution characteristics. With this approach, a reflecting mirror is divided into a number of reflecting areas, and the topological shape of a reflecting surface is designed by taking into consideration the light distribution characteristics of each reflecting area. A composite reflecting mirror has been proposed and used in practice, this mirror having not only a rotary parabola plane but also a parabola column plane and the like, as the topological shape of each reflecting area (e.g., JP-A4-253101 and JP-A-9-306220).

The above-described reflecting mirrors are all a composite reflecting mirror having a reflecting surface made of a set of different parabola planes. Therefore, a definite borderline appears at the junction between respective reflecting areas, and in some cases steps are formed along these borderlines. These reflecting mirrors are, therefore, essentially associated with the problem of glare light.

An invention of a reflecting mirror satisfying light distribution characteristics necessary for vehicle lamp assemblies and having a continuous curved plane other than a parabola as the horizontal cross sectional shape, is disclosed in the publication of JP-A-9-82106.

The design method for the topological shape of a reflecting surface of a reflecting mirror disclosed in the publication of JP-A-9-82106 will be described briefly. First, a reference curve is determined which has a parabolic curve segment and an elliptic curve segment alternately disposed along a direction departing from the optical axis in the horizontal plane. In this case, the reference curve is determined so that an angle between the optical axis and a light beam reflected from each curve segment of the reference curve becomes larger as the curve segment is nearer to the optical axis.

Consider now a virtual rotary parabola plane having an axis, which is parallel to a vector of a light beam emitted from a light source and reflected at an arbitrary point on the reference curve and passes through the reflection point, and a focal point at a position of the light source. A reflecting surface is constituted of a set of cross lines between the rotary parabola plane and a vertical plane including the light beam vector.

A light beam image having a large projection area and formed by light beams reflected in an area near the center of the reflecting surface, is diffused largely in the horizontal direction. It is therefore possible to establish a sufficient vertical width of an area of a light distribution pattern near the opposite ends in the horizontal direction. A light source image having a small projection area and formed by an area near the peripheral area of the reflecting surface is controlled to contribute to the formation of the central area of the light distribution pattern. It is therefore possible to compensate for an insufficient illuminance caused by the lamp inserting hole in the reflecting surface.

If a front lens disposed in front of the reflecting mirror has almost no function of changing the refraction direction, the shape of the reflecting mirror can be seen directly via the front lens. The definite borderlines are therefore seen, which may be improper from the viewpoint of product design. When the reflecting mirror is used as a vehicle lamp assembly, the size and design are restricted depending upon the vehicle shape. While both these restrictions and light distribution characteristics are to be satisfied, it is difficult to design the reflecting mirror whose borderlines are not seen clearly.

For example, in the case of the composite reflecting mirror made of a set of a number of parabola plane reflecting areas and allowing steps to be formed at junctions between reflecting areas, it is possible to design the topological shape of the reflecting surface while the light distribution characteristics of each reflecting area is taken into consideration. Therefore, even if there is a change in the height of the reflecting mirror or the like because of restrictions on design or the like, design can be performed again to obtain desired light distribution characteristics by taking into consideration mainly those reflecting areas to be changed. The work required for such change is relatively simple.

However, if a reflecting mirror is to be designed in order to prevent the clear borderlines from appearing on the reflecting surface, a change in a partial reflecting area affects the topological shape of adjacent reflecting areas. More specifically, each small reflecting area is designed by considering the reflection directions at the border lines with adjacent reflecting areas and by satisfying the conditions of simulating the reflection directions and making small the deflection angle of a tangent line of the reflecting surface. This work is required to perform three-dimensionally. A change in the topological shape of one reflecting area results in a change in the topological shapes of adjacent reflecting areas. Such a change in the topological shape occurs in succession. Namely, the topological shapes of all areas of the reflecting surface are changed and the light distribution characteristics change. In order to design a reflecting mirror satisfying both the light distribution characteristics and design restrictions, a number of design works is required on the try-and-cut basis, resulting in a very long time and a large amount of man power.

If a reflecting surface of a lamp assembly particularly for opposite vehicle lane beams is to be designed, it is necessary to define a cut-off light distribution on the screen in order not to illuminate light in an area higher than a certain height. With a conventional design method, the topological shapes of a number of reflecting areas are designed so as to satisfy the cut-off light distribution of each reflecting area. In this case, the area on the screen illuminated with light beams reflected from the reflecting mirror is curved to have a banana shape with a lowered central area.

This essentially results from that the topological shape of the reflecting mirror is formed by a basic unit of the parabola reflecting plane shape and sharp cut-off characteristics are difficult to be obtained. With the lamp assembly having the banana-shaped light distribution characteristics, the right and left raised portions are improper because they become blinding light to opposing vehicles. In order to align the reflected image of a light source with the cut-off line, it is necessary to design the reflected image of the light source for each reflecting area and couple those reflected images. This process is very complicated and takes a long time. For example, if a reflecting mirror has a composite reflecting surface made of about 100 reflecting areas, one computer simulation for fine adjustment of the topological shape of each reflecting area to smoothly coupling the reflecting areas takes about 10 hours.

In view of the above-described circumstances, a reflecting mirror capable of realizing the light distribution characteristics with a high degree of design freedom has been long desired.

SUMMARY OF THE INVENTION

It is an object of the present invention to provide a reflecting mirror manufacture method and a lamp assembly suitable for obtaining desired light distribution characteristics.

According to one aspect of the present invention, there is provided a method of manufacturing a reflecting mirror for reflecting light radiated from a light source and illuminating a front space, comprising the steps of: defining light distribution characteristics for defining a correspondence relation between: a position of a reflection point on a cross line between a reference plane and a reflecting surface of the reflecting mirror whose topological shape is to be determined, the reference plane cutting the reflecting surface and a virtual screen set in front of the reflecting mirror; and a position of an image of the light source projected upon the virtual screen by light radiated from the light source and reflected at the reflection point, the light distribution characteristics providing a feature that the image of the light source formed by the light reflected at the reflection point has some width on the virtual screen in a direction crossing the reference plane when the reflection point is positioned in a first area in a direction along the cross line between the reference plane and the reflecting surface; determining in the reference plane a path line coincident with or approximate to the cross line between the reflecting surface and the reference plane, in accordance with the light distribution characteristics; determining a profile curve for each of a plurality of sampling points dispersibly distributed on the path line, in accordance with the light distribution characteristics, the profile curve passing through the sampling point, corresponding to the topological shape of the reflecting surface, and providing a feature that when the sampling point is positioned in the first area, as the reflection point moves along the profile curve, the image of the light source moves in the direction crossing the reference plane in accordance with the light distribution characteristics; and determining the topological shape of the reflecting surface in accordance with the profile curve determined for each sampling point.

According to another aspect of the present invention, there is provided a lamp assembly comprising: a light source; and a reflecting mirror for reflecting light radiated from the light source and illuminating a front space, wherein: in an x-y-z orthogonal coordinate system with a positive direction of a z-axis being set to a direction of the front space, a reflecting surface of the reflecting mirror is defined by an x-axis direction diffusion area, a y-axis direction rising area and a y-axis direction return area; in the x-axis direction diffusion area, as a reflection point moves in an x-axis direction, an illumination point also moves in the x-axis direction, and as the reflection point moves in a y-axis direction, a y-coordinate of the illumination point does not move; in the y-axis direction rising area, as the reflection point moves becoming remote from a z-x plane, the illumination point also moves becoming remote from the z-x plane; and in the y-axis direction return area, as the reflection point moves becoming remote from the z-x plane, the illumination point moves becoming near to the z-x plane.

A reflected light is diffused in one direction and can be diffused in another direction crossing the one direction. When the reflecting mirror manufacture method is applied to the reflecting mirror of a vehicle front lamp for crossing, the beam can be diffused from the horizontal direction to an upper oblique direction.

DETAILED DESCRIPTION OF THE PREFERRED EMBODIMENTS

In order to make it easy to describe a reflecting mirror manufacture method according to an embodiment of the invention, a coordinate system is defined.

Figure 1:
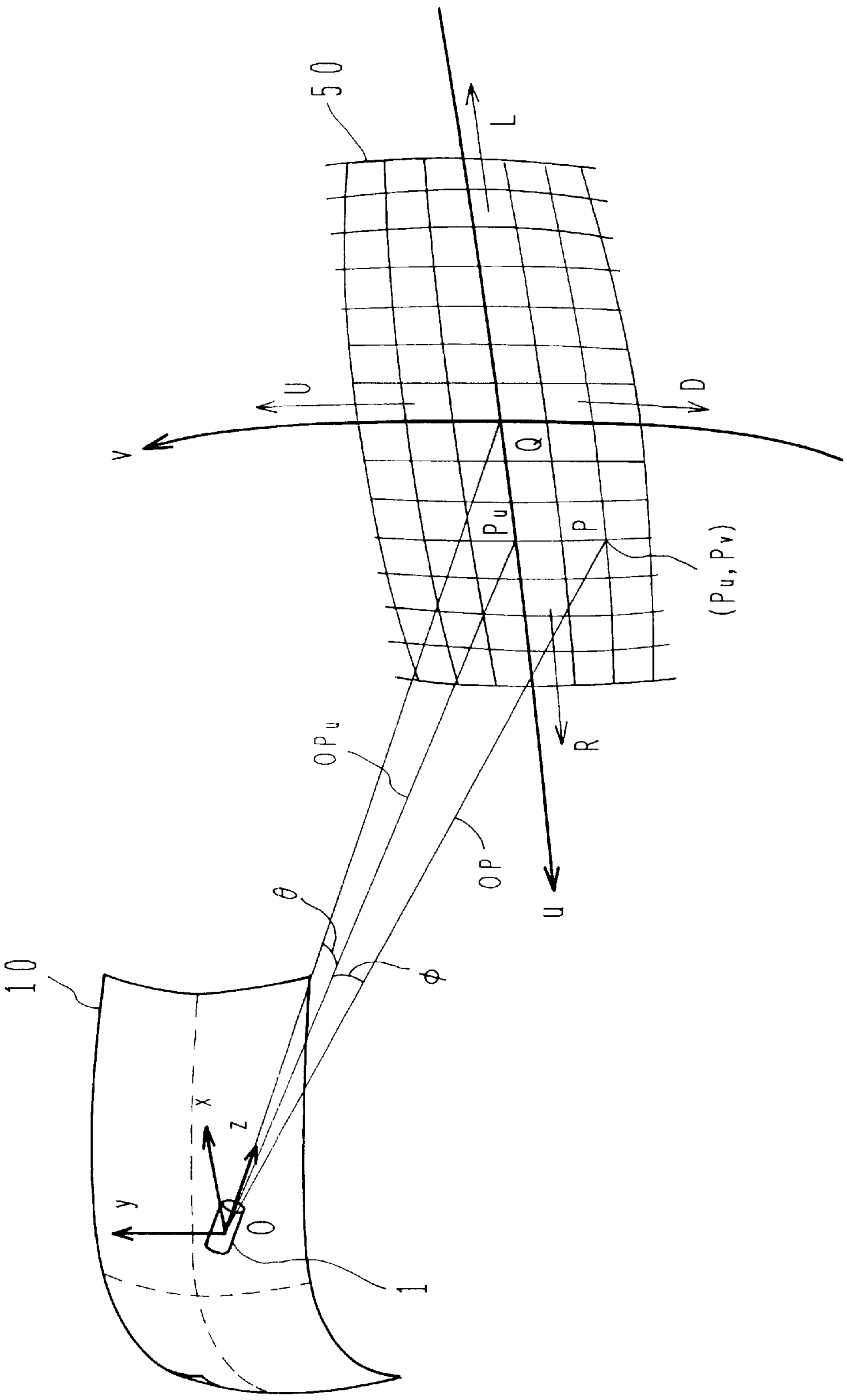
FIG. 1 is a perspective view of a coordinate system to be used for the description of a reflecting mirror manufacture method according to an embodiment and a reflecting mirror manufacture method proposed previously.

FIG. 1 is a perspective view used for illustrating a coordinate system. A light source 1 is disposed at an origin O of an x-y-z orthogonal coordinate system. The light source 1 is, for example, a filament of an electric lamp. The electric lamp filament can be approximated generally to a cylindrical shape having the x-axis as its center axis. A reflecting mirror 10 is disposed at the back (in the negative direction of the z-axis) of the light source 1. The reflecting mirror 10 reflects light radiated from the light source 1 and illuminates a front (in the positive direction of the z-axis) space.

Consider a virtual screen 50 disposed facing the reflecting mirror 10. The virtual screen 50 is constituted of a part of the surface of a sphere having a radius of, for example, 10 m and the origin O of the x-y-z coordinate system as its center. The shape of the virtual screen 50 can be determined as desired in accordance with the shape of an area to be illuminated. For example, the plane perpendicular to the z-axis may be used, or a spherical plane having a radius of about 25 m may be used.

A cross line between the virtual screen 50 and the z-x plane is used as a u-axis and a cross line between the virtual screen 50 and the y-z plane is used as a v-axis. A cross point (screen origin) between the u- and v-axes is represented by Q. As a vector directed in the positive direction of the z-axis is slanted toward the negative direction of the x-axis, the slanted vector moves the cross point between the slanted vector and virtual screen 50. This moving direction of the cross point is defined as the positive direction of the u-axis. As a vector directed in the positive direction of the z-axis is slanted toward the positive direction of the y-axis, the slanted vector moves the cross point between the slanted vector and virtual screen 50. This moving direction of the cross point is defined as the positive direction of the v-axis.

If the reflecting mirror is a front lamp of a vehicle, the x-y-z orthogonal coordinate system is defined so that the z-x plane is generally horizontal and the y-axis is directed vertically upward. As the front space is viewed from the vehicle, the positive direction of the u-axis is a right (R) direction, the negative direction thereof is a left (L) direction, the positive direction of the z-axis is an up (U) direction and the negative direction thereof is a down (D) direction. In the following description, the positive direction of the u-axis is called a right direction and the positive direction of the v-axis is called an up direction.

The u-coordinate Pu at an arbitrary point P on the virtual screen 50 is defined by a straight line OPu interconnecting the point (u, v)=(Pu, O) and the original O and an angle θ relative to the z-axis. The v-coordinate Pv of a point P is defined by an angle ϕ between the straight line OPu and a straight line OP.

Figure 2:
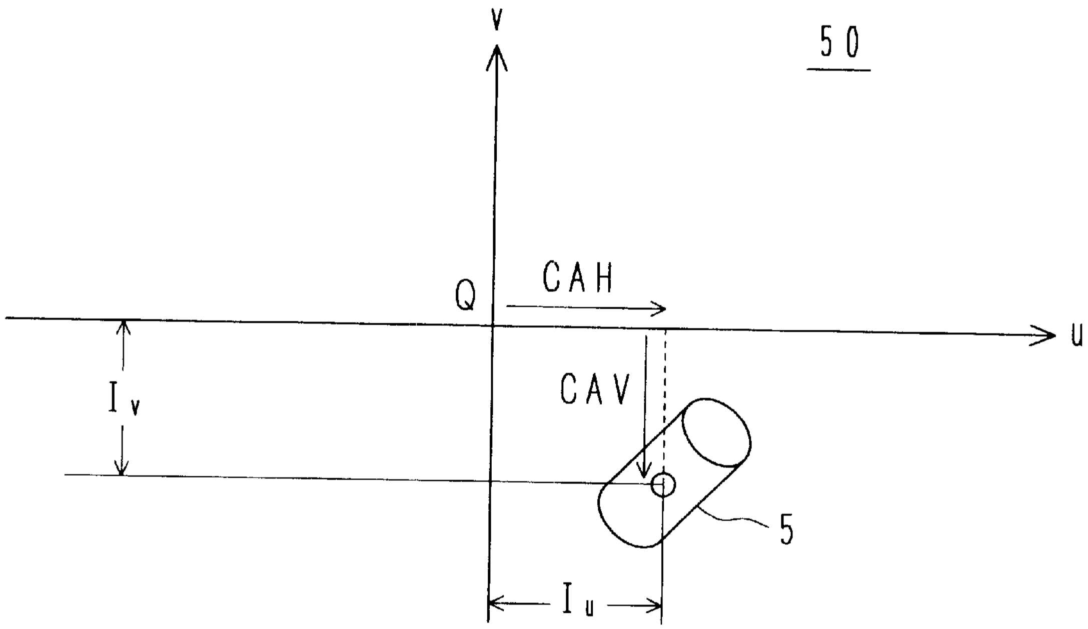
FIG. 2 is a diagram illustrating a method of defining the position of an image on a virtual screen.

FIG. 2 shows an image 5 of a light beam radiated from the light source shown in FIG. 1, reflected at one point on the reflecting surface of the reflecting mirror and projected upon the virtual screen 50. The center of the image 5 has a u-coordinate Iu and v-coordinate Iv. An angle ϕ shown in FIG. 1 corresponding to the u-coordinate Iu is called CAH (control angle in horizontal measure), and an angle ϕ shown in FIG. 1 corresponding to the v-coordinate Iv is called CAV (control angle in vertical measure).

Prior to describing the embodiment of the invention, the reflecting mirror manufacture method proposed previously by the present inventors will be described.

Figure 3:
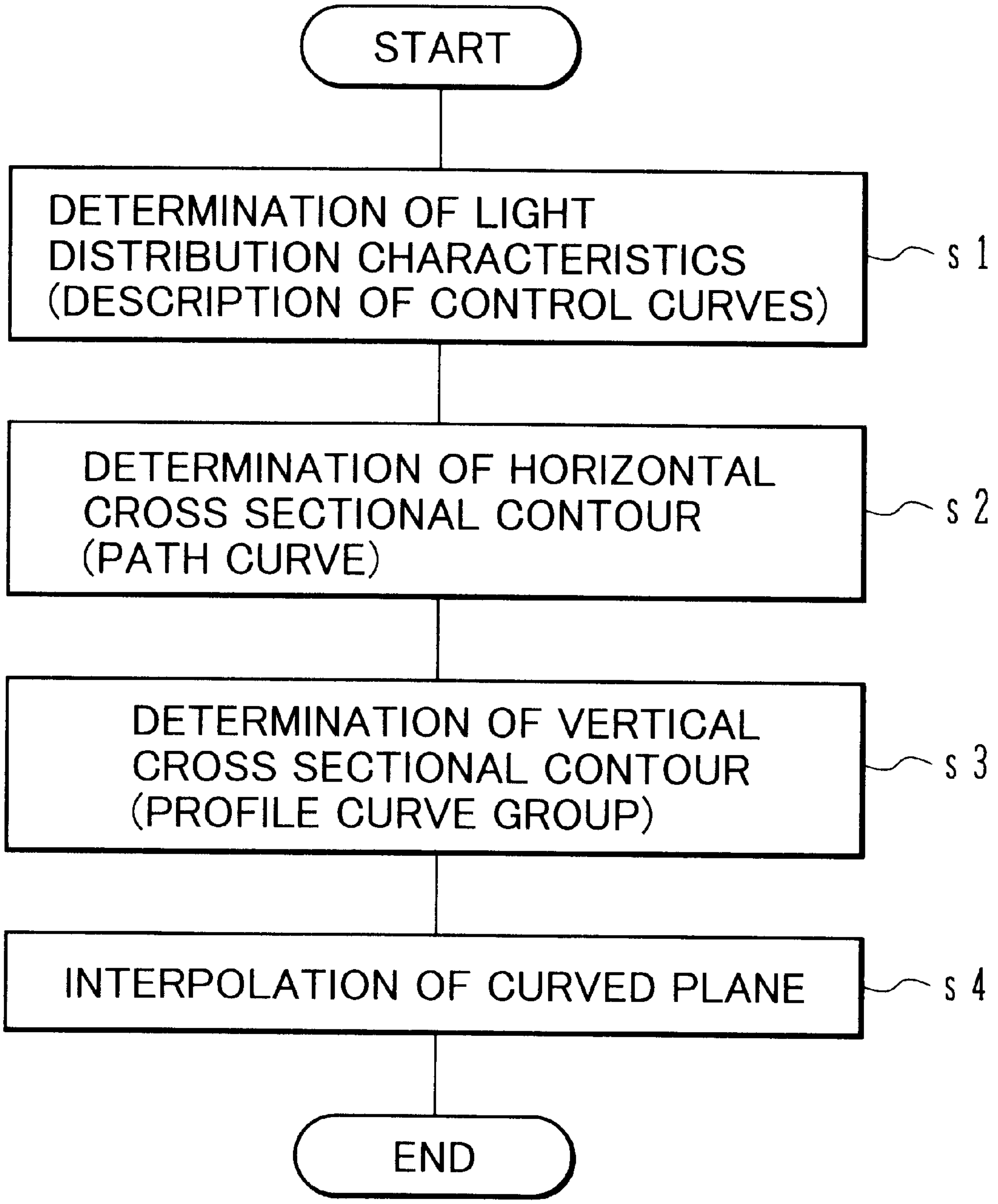
FIG. 3 is a flow chart illustrating the process of determining the topological shape of the reflecting surface of a reflecting mirror proposed previously.

FIG. 3 is a flow chart illustrating a reflecting mirror manufacture process proposed previously. With reference to the flow chart shown in FIG. 3, the reflecting mirror manufacture method proposed previously will be described. It is herein assumed that the light source 1 is a point light source placed at the origin of the x-y-z coordinate system.

At step s1, the light distribution characteristics are determined. The light distribution characteristics mean the relation between the position of a reflection point on the reflecting surface and the position of a projected image of light reflected at the reflection point. First, the relation is defined between: the position of a reflection point on a cross line between a reference plane passing the origin O and a reflecting plane to be determined; and the position of a projection image 5 of light radiated from the light source 1 and reflected at the reflection point.

The light distribution characteristics of the reflecting mirror in the horizontal direction can be expressed by the relation between the coordinate of the reflection point and CAH corresponding to the u-coordinate Iu of the projection image 5 on the virtual screen 50. The light distribution characteristics in the vertical direction can be expressed by the relation between the coordinate of the reflection point and CAV corresponding to the v-coordinate Iv of the projection image 5 on the virtual screen 50. For example, by setting the reference plane as the z-x plane (horizontal plane), the relations between the x-coordinate of the reflection points and CAH and CAV corresponding to the reflection point are defined.

Figure 4A:
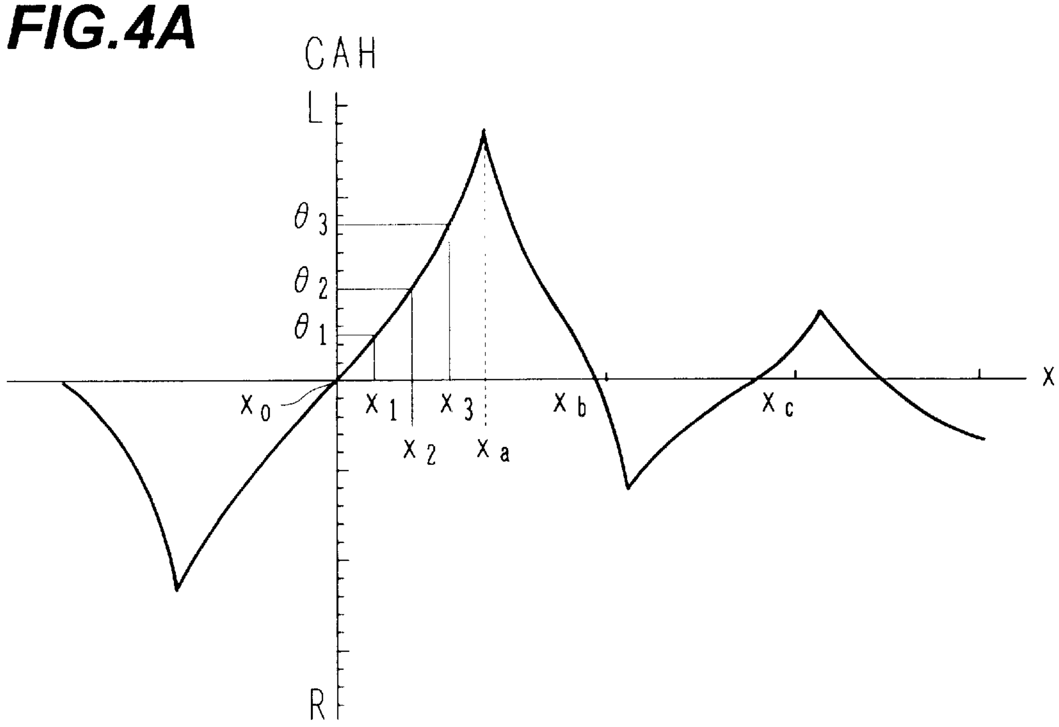
FIGS. 4A and 4B are graphs showing examples of control curves respectively in the horizontal and vertical directions proposed previously.

FIG. 4A shows an example of the relation between the x-coordinate of the reflection point and CAH. The abscissa represents the x-coordinate of the reflection point and the ordinate represents CAH. The upward direction of the ordinate is the left direction. The graph shown in FIG. 4A passes through the origin. This means that light reflected at the point x=0 reaches the point u=0 on the virtual screen 50. As the reflection point moves to the positive direction of the x-axis, the projection image gradually moves to the left.

CAH takes a maximum value in the left direction at $x=x_a$. This means that light reflected at the reflection point having the x-coordinate of $x_a$ illuminates an area near the left end of the illumination area. In the area from the x-coordinate from $x_a$ to $x_b$, as the reflection point moves to the positive direction of the x-axis, the projection image moves to the right direction. Light reflected at the reflection point having the x-coordinate $x_b$ reaches the origin (at u=0) of the virtual screen 50. In the area the x-coordinate of the reflection point from $x_b$ to $x_c$, the reflected light illuminates the right area of the origin of the virtual screen.

The graph of FIG. 4A indicates dispersion of reflected light to the right and left by using the width of the reflecting plane in the horizontal direction. A progressing direction of reflected light as the reflection point moves up and down on the reflecting surface is not defined at all.

Figure 4B:
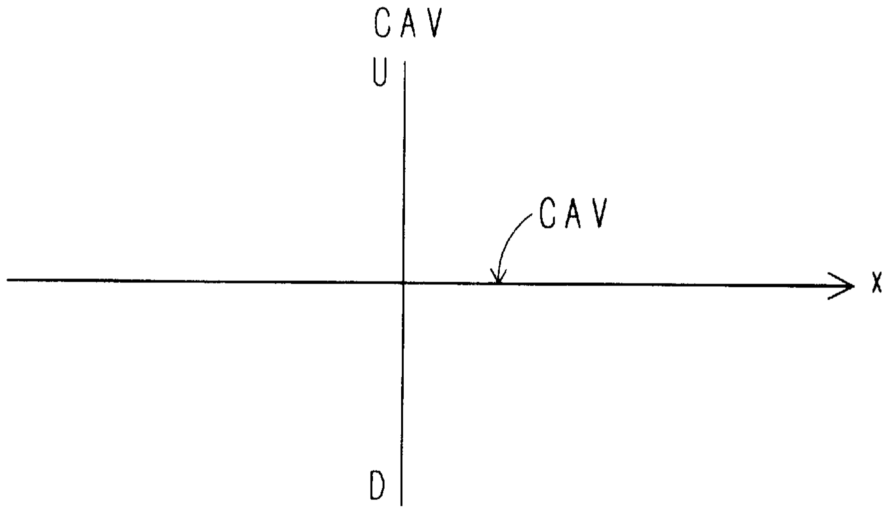

FIG. 4B shows an example of the relation between the x-coordinate of the reflection point and CAV. The abscissa represents the x-coordinate of the reflection point and the ordinate represents CAV. The upward direction of the ordinate is the upward direction of the virtual screen 50. FIG. 4B indicates that the projection image 5 is flush with the height of the origin of the virtual screen 50 on the whole reflecting surface. Curves shown in the graphs of FIGS. 4A and 4B are called control curves.

In FIGS. 4A and 4B, the z-x plane is used as the reference plane. Another virtual plane cutting the reflecting plane and virtual screen may also be used as the reference plane. Generally, a plane slanted from the horizontal plane may be used as the reference plane. In this case, the position of the reflection point is defined not by the x-coordinate only but by the x- and y-coordinates.

At step s2 shown in FIG. 3, the horizontal cross sectional contour (path curve) of the reflecting mirror 10 is determined. A method of determining a path curve will be described with reference to FIG. 5. The z-x plane is used as the reference plane at step s1. The path curve is therefore formed in the z-x plane. If the reference plane is slanted relative to the horizontal plane, the path curve is formed not in the z-x plane but in the slanted reference plane.

Figure 5:
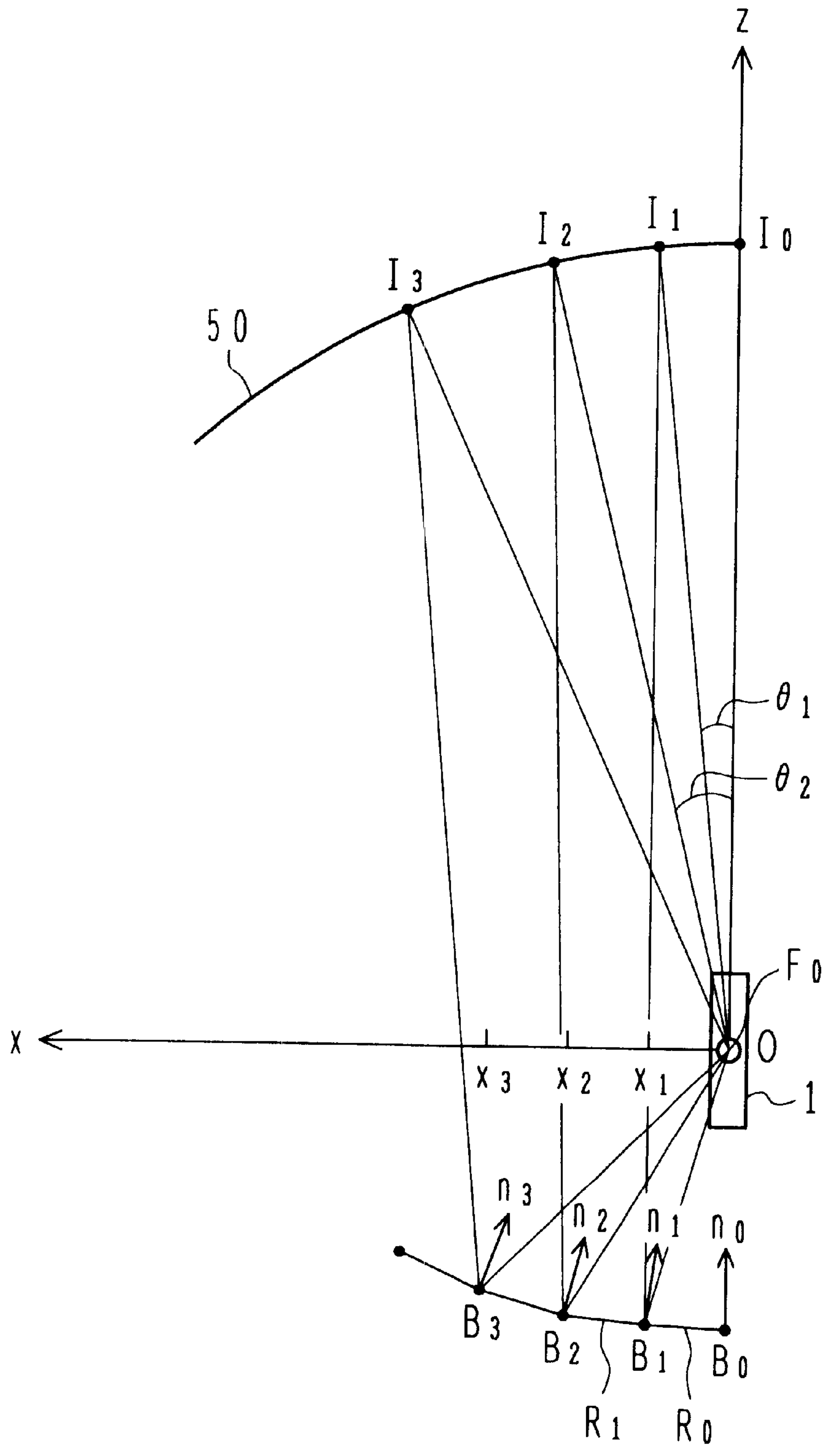
FIG. 5 is a diagram illustrating a method of determining a path curve.

As shown in FIG. 5, the light source 1 is disposed at the origin O. The center $F_0$ of the light source 1 is coincident with the origin O. First, a start point for forming a path curve on the z-x plane is determined. In FIG. 5, a point $B_0$ on the z-axis slightly at the back of the origin is used as the start point. In this case, the position of the start point $B_0$ corresponds to the position where the light source 1 is mounted on the reflecting mirror. As shown in FIG. 4A, CAH of the projection image at the position x=0 is 0. Namely, a projection image $I_0$ of light reflected at the point $B_0$ is projected on the virtual screen 50 at its origin. In order to allow the light radiated from the point $F_0$ to reach the projection image $I_0$, a fine reflecting surface $R_0$ is formed near the start point $B_0$. A normal vector no of the reflecting surface $R_0$ is positioned on the z-axis. A point having the x-coordinate $x_1$ on the fine reflecting surface $R_0$ is used as a first point $B_1$, where $x_1=\Delta x$. $\Delta x$ is, for example, about 0.1 mm. As seen from FIG. 4A, CAH is $\theta_1$ at the x-coordinate $x_1$.

In FIG. 5, a point $I_1$ on the virtual screen 50 is determined with the angle $\theta_1$ between the straight line $OI_1$ and the z-axis. FIG. 4A indicates that light radiated from the center point $F_0$ and reflected at the point $B_1$ reaches the point $I_1$ on the virtual screen 50. A fine reflecting surface $R_1$ is therefore defined which reflects light radiated from the center point $F_0$ at the point $B_1$ and makes the reflected light reach the point 11. A normal vector $n_1$ of the reflecting surface $R_1$ bisects the angle between a straight line $B_1I_1$ and a straight line $B_1F_0$.

Figure 7:
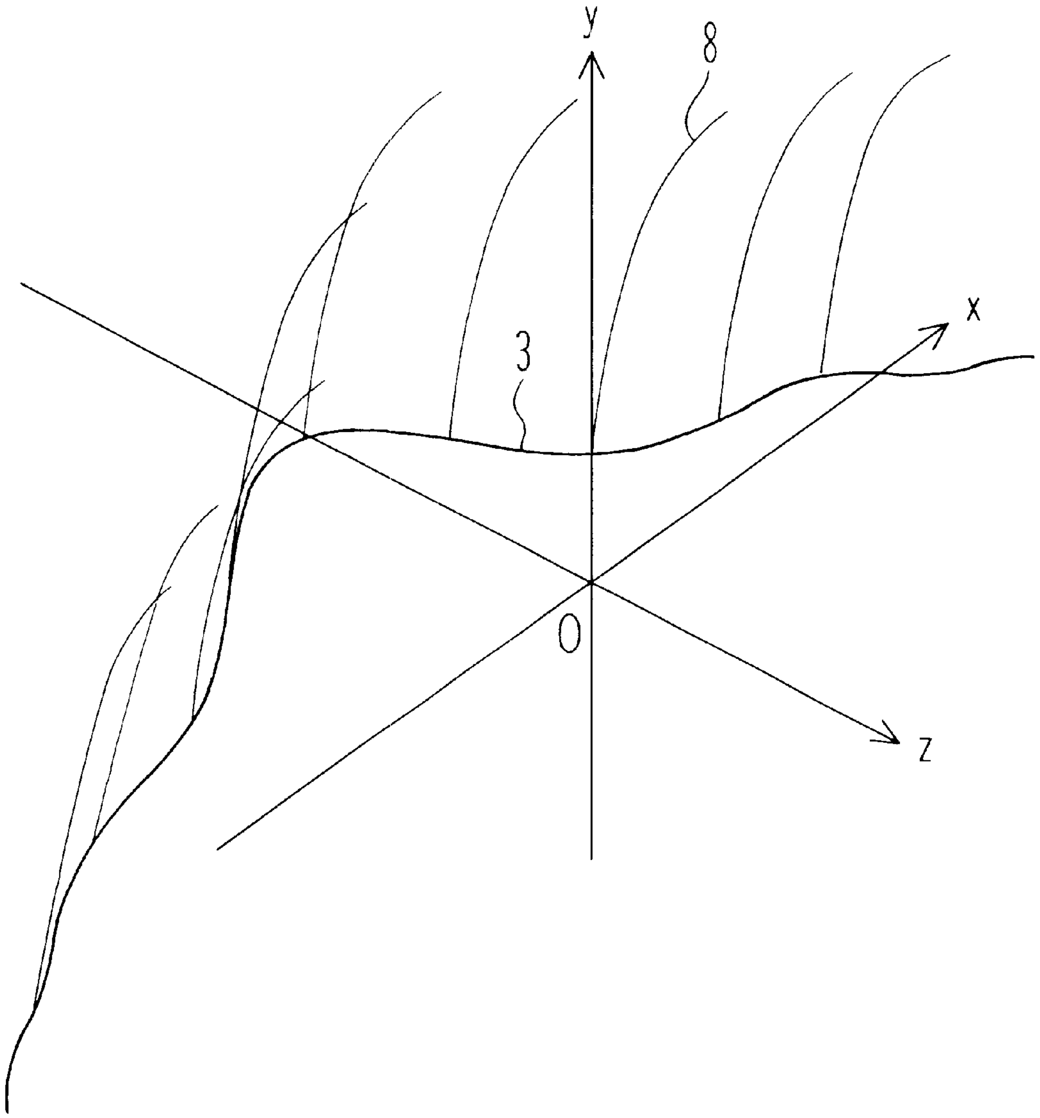
FIG. 7 is a diagram showing an example of a path curve and a profile curve.

A point having the x-coordinate $x_2$ on the reflecting surface $R_1$ is used as a second point $B_2$, where $x_2-x_1=\Delta x$. The above operations are repeated to obtain the third point $B_3$ and following points. The obtained point group $B_0$, $B_1$, $B_2$, . . . is interpolated by using a spline curve to determine the path curve basing upon the light distribution characteristics shown in FIG. 4A. The path curve determined as above represents a cross line between the reflecting surface to be designed and the z-x plane, and defines the outline topological shape of the reflecting surface to be defined. An example of the path line 3 is shown in FIG. 7. Instead of interpolating the point group $B_0$, $B_1$, $B_2$, . . . , a polygonal line having these points as its deflecting points may be used as the path curve 3.

At step s3 shown in FIG. 3, a vertical cross sectional contour (profile curve group) on the reflecting surface is determined. A method of determining a profile curve group will be described with reference to FIG. 6. A plurality of sampling points are determined which distribute dispersibly on the path curve 3 determined at step s2. A point C shown in FIG. 6 indicates one of the plurality of sampling points. From the control curves shown in FIGS. 4A and 4B, CAH and CAV corresponding to the sampling point C are obtained. At this stage, light radiated from the light source 1 is reflected at the sampling point C, and the reflected light forms a projection image on the virtual screen 50, the projection image being defined by CAH and CAV corresponding to the sampling point C. For example, as the reflecting surface, a rotary ellipse plane is used which has the light source 1 as a first focal point and the projection image as a second focal point and passes through the sampling point C. Although CAV=0 in FIG. 4B, CAV has a certain finite value in FIG. 6.

Figure 6:
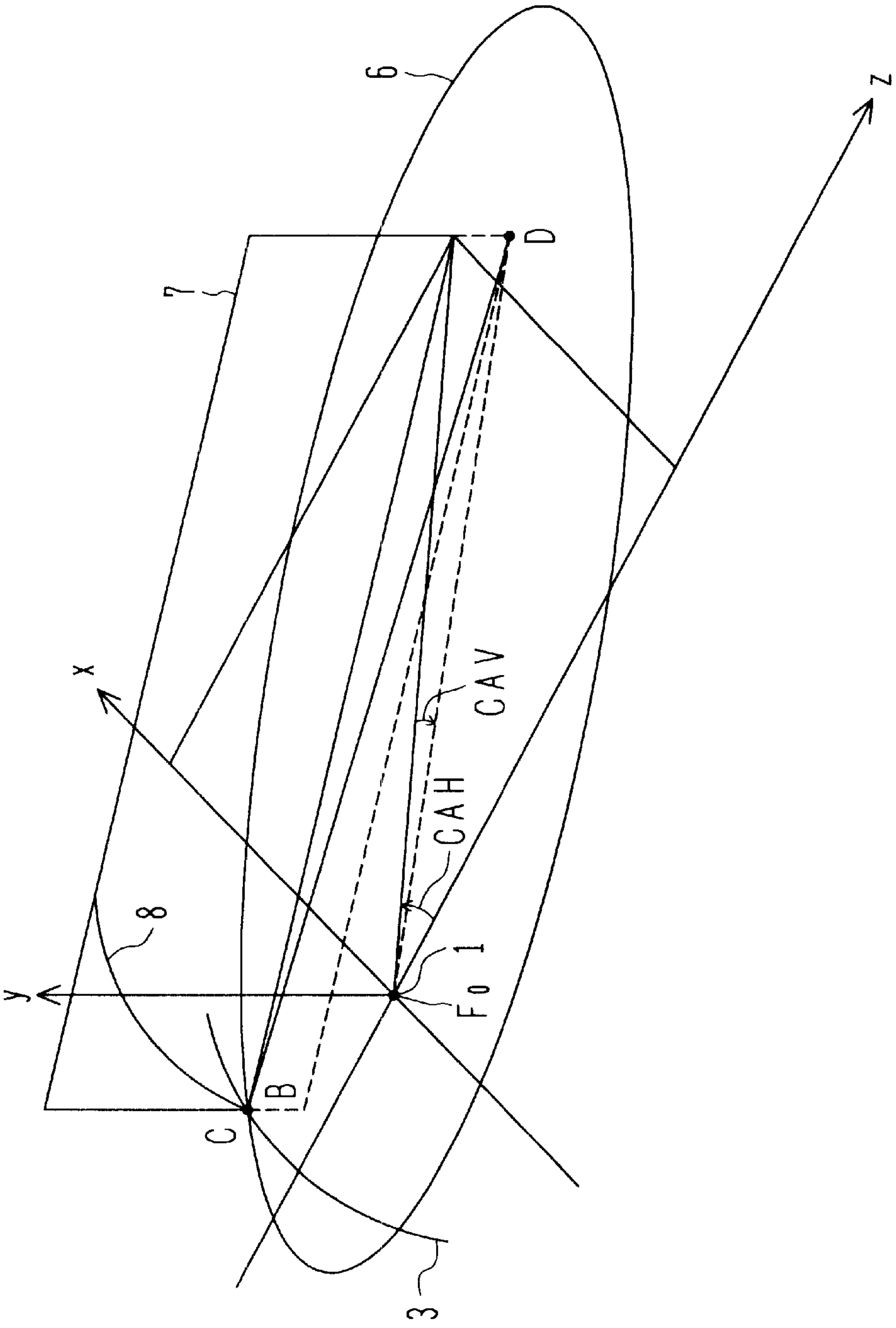
FIG. 6 is a diagram illustrating a method of determining a profile curve proposed previously.

The coordinate values (x, y, z)=(Cx, 0, Cz) of the sampling point C are determined, and this point is used as a profile end point. From the control curves shown in FIGS. 4A and 4B, CAH and CAV at x=Cx are obtained. A point D on the virtual screen corresponding to CAH and CAV is obtained. A rotary ellipse plane 6 is obtained which has the center $F_0$ of the light source 1 as the first focal point and the point D as the second focal point and passes through the sampling point C. In FIG. 6, the rotary ellipse plane 6 is shown as the cut plane passing through the points C, D and $F_0$.

Consider next a virtual plane 7 in parallel to the y-axis including the straight line CD. A cross line between the virtual plane 7 and the rotary ellipse plane 6 is used as a profile curve 8. If the position of the point D is remote from the light source 1, the rotary ellipse plane 6 can be approximated to a rotary parabolic surface near the sampling point C. In this case, the virtual plane 7 may be a vertical plane in parallel to a straight line $F_0D$. The profile curve 8 is determined for each of all the sampling points on the path curve 3 obtained at step s2, e.g., for each of sampling points with $\Delta x$ of about 0.1 mm similar to step s2. Examples of a plurality of profile curves 8 are shown in FIG. 7.

At step s4 shown in FIG. 3, a piecewise polynomial curved surface (e.g., spline blended surface) passing all the profile curves 8 is obtained. A method of obtaining a spline blended surface is described, for example, in Advances in industrial Engineering Vol. 11, Surface Modeling for CAD/CAM (Edited by Byong K. Choi, published by Elsebier Science Publishers B. V. 1991), in Paragraph 9.4 of Chapter 9.

A spline blended surface can be obtained easily by using a general CAD. Interpolation may be performed by other mathematical processes using a different curved surface such as Baje curved surface.

The reflecting mirror having the reflecting surface designed in accordance with the above-described previous proposal has the characteristics quite similar to the light distribution characteristics indicated by the control curves shown in FIGS. 4A and 4B.

There is a small difference between the light distribution characteristics defined by the control curves and actual light distribution characteristics. This is because the path curve is obtained through curve interpolation, and the profile curves are obtained through curved surface interpolation, to determine the topological shape of the reflecting surface. However, if the pitch of sampling points for determining the profile curve is made fine, the light distribution characteristics almost coincident with the control curves can be obtained. If a halogen lamp is used for a vehicle lamp assembly, the pitch of profile curves is set to about 1 mm. In this case, the actual light distribution characteristics on a virtual screen set 10 m before the lamp assembly match well the control curves used as the design criterion.

Next, an embodiment of the invention will be described. The reflecting mirror manufacture method of this embodiment is suitable for realizing a light distribution pattern of a vehicle front lamp for crossing.

Figure 8:
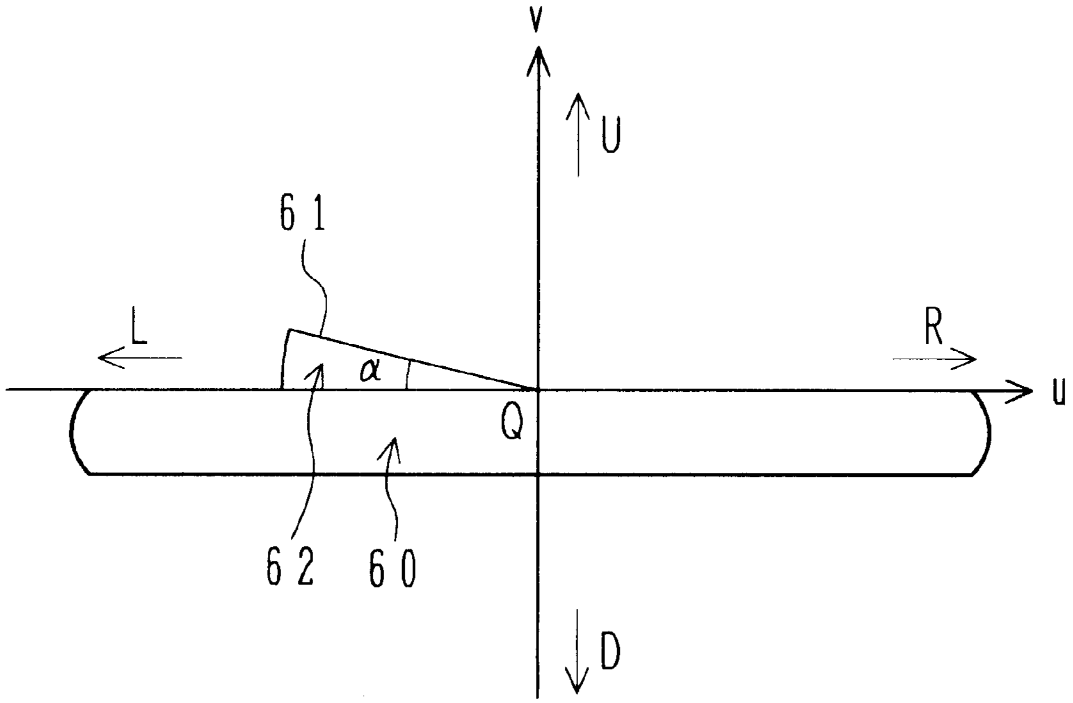
FIG. 8 is a graph showing an example of a light distribution pattern of a vehicle front lamp.

FIG. 8 shows a light distribution pattern on a virtual screen of a front lamp of a vehicle running on a left side. A horizontal diffusion light distribution area 60 diffuses in the horizontal direction slightly under a horizontal u-axis. The horizontal diffusion light distribution area 60 can be formed, for example, by using the above-described reflecting mirror manufacture method proposed previously.

In the previous proposal, it was assumed that the light source was a point light source. An actual light source is generally approximated to a cylindrical shape. If the light source is a point light source, its image has no vertical expansion as shown in FIG. 4B. If the light source has a finite size, light radiated from the area other than the origin O shown in FIG. 1 illuminates an area having some expansion in the vertical direction.

If a cylindrical light source is disposed in parallel to the z-axis shown in FIG. 1 and the front end (end on the side of the virtual screen) of the light source is aligned with the origin O, light reflected from the area y>0 of the reflecting surface illuminates the area v<0 of the virtual screen 50. Therefore, in determining the topological shape of the area y>0 of the reflecting surface 10 by using the previously proposed method, it is possible to illuminate the horizontal diffusion light distribution area slightly under the cut-off line in the horizontal direction defined by the control curve CAV shown in FIG. 4B, assuming that the front end of the light source I is positioned at the position of the spot light source. Conversely, in determining the topological shape of the area y<0 of the reflecting surface 10, it is possible to illuminate a similar horizontal diffusion light distribution area, assuming that the back end of the light source 1 is positioned at the position of the spot light source.

The description for this embodiment continues by reverting to FIG. 8. A light distribution boarder straight line 61 extends from the origin Q of the virtual screen to the upper left. An angle a between the negative direction (L direction) of the u-axis and the light distribution border straight line 61 is generally 15°. A vertical diffusion light distribution area 62 is disposed between the negative direction side of the u-axis and the light distribution border straight line 61. In the case of a front lamp of a vehicle for running the right side, the vertical diffusion light distribution area 62 is disposed in the positive area (R direction area) of the u-axis. This embodiment aims at forming such a vertical diffusion light distribution area 62.

Figure 9A:
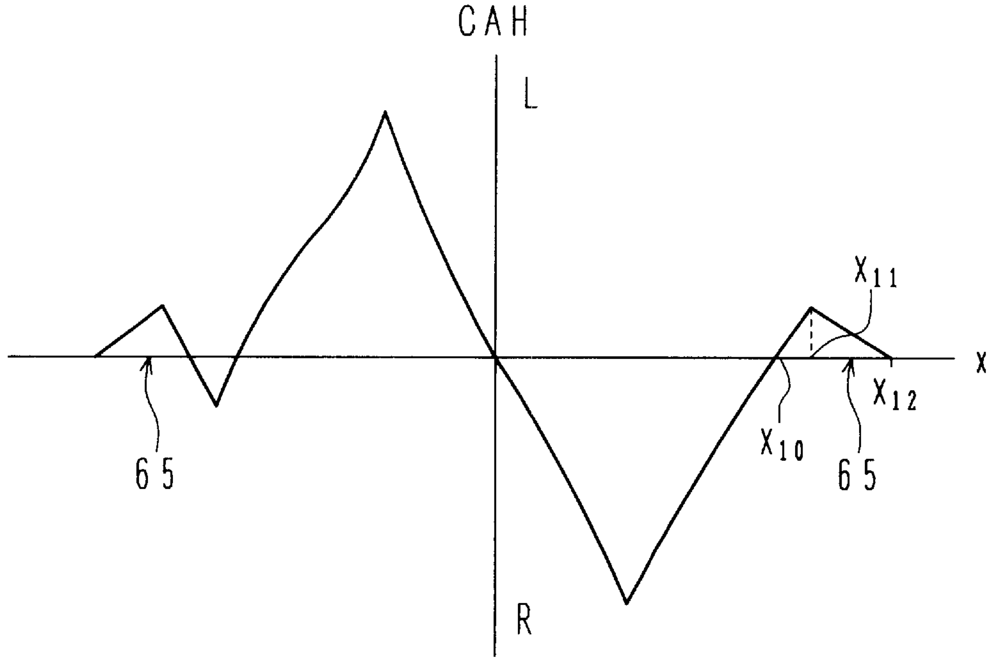
FIGS. 9A and 9B are graphs showing examples of control curves respectively in the horizontal and vertical directions according to an embodiment.
Figure 9B:
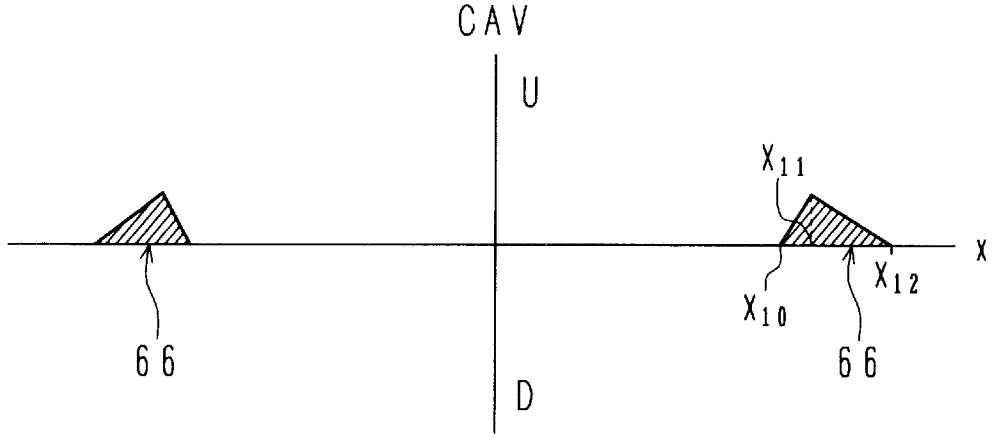

FIGS. 9A and 9B show control curves indicating CAH and CAV for forming a vertical diffusion light distribution area. As shown in FIG. 9A, areas 65 for illuminating the L direction are defined in the areas near both ends of the reflecting surface (e.g., in the area from the x-coordinate from $x_{10}$ to $x_{12}$). CAH deflects at a point $x=x_{11}$ and has a local maximum at this point. It is not necessarily required to dispose the areas 65 in the areas near both ends in the x-axis direction, but the area may be disposed in the area near only one end or may be disposed near the central area.

As shown in FIG. 9B, areas 66 are defined for diffusing illumination light in the vertical direction at a region corresponding to the areas 65. CAV deflects at a point $x=x_{11}$ and has a local maximum at this point. This means that light reflected on the reflecting surface corresponding to the areas 66 diffuses in some area in the vertical direction. This embodiment will be described by taking as an example the case wherein the illumination light illuminates the vertical diffusion light distribution area 62 shown in FIG. 8.

A path curve is obtained by processes similar to those of steps s1 and s2 shown in FIG. 3. Next, a process of determining the vertical cross sectional contour of the reflecting surface in order to realize the vertical diffusion light distribution area will be described.

Figure 10A:
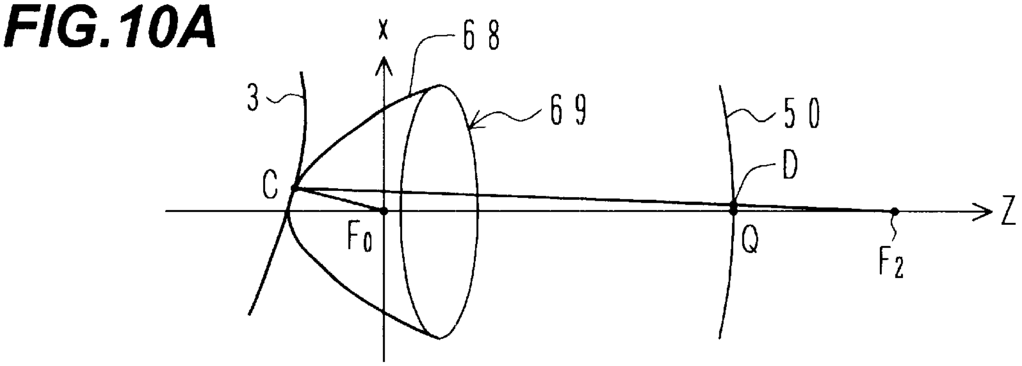
FIGS. 10A to 10D are diagrams illustrating a method of determining an intermediate curve plane, the method being used for a reflecting mirror manufacture method according to an embodiment.
Figure 10B:
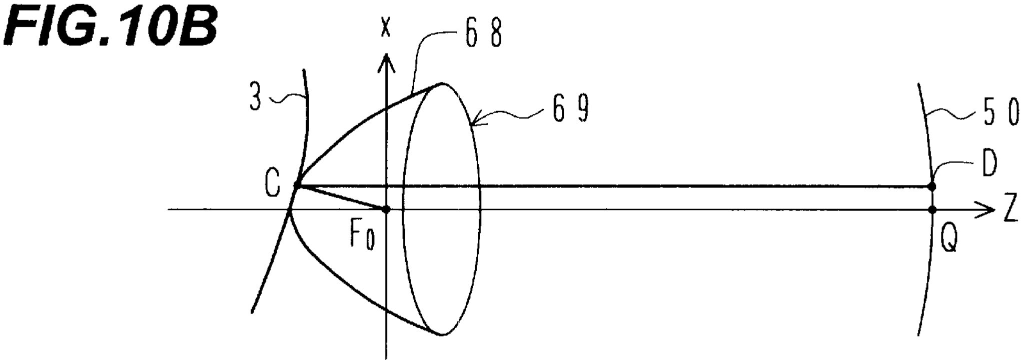
Figure 10C:
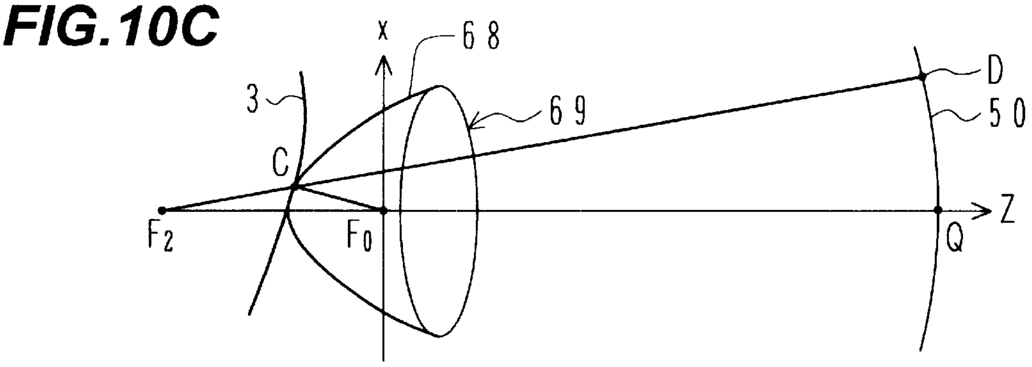
Figure 10D:
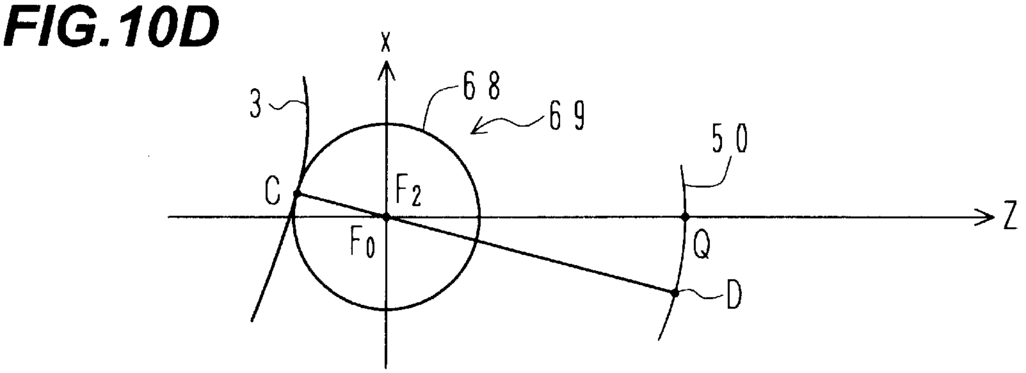

As shown in FIG. 10A, attention is paid to one sampling point C on the path curve 3. From CAH shown in FIG. 9A, an illumination point D on the vertical screen 50 corresponding to the sampling point C is obtained. A cross point $F_2$ between a straight line CD and the z-axis is obtained. FIG. 10A indicates that the cross point $F_2$ is positioned on the positive side of the z-axis more than the sampling point C. FIG. 10B indicates that the cross point $F_2$ cannot be obtained because the straight line CD is in parallel to the z-axis. FIG. 10C indicates that the cross point $F_2$ is positioned on the negative side of the z-axis more than the sampling point C. FIG. 10D indicates that the cross point $F_2$ is coincident with the position $F_0$ of the light source.

In the case shown in FIG. 10A, an intermediate curve 68 of an ellipse is obtained having as its focal points the point light source $F_0$ and cross point $F_2$ and passing through the sampling point C. In the case shown in FIG. 10B, an intermediate curve 68 of a parabola is obtained having as its focal point the point light source $F_0$ and as its center axis the z-axis and passing through the sampling point C. In the case shown in FIG. 10C, an intermediate curve 68 of a hyperbola is obtained having as its focal points the point light source $F_0$ and cross point $F_2$ and passing through the sampling point C. In the case shown in FIG. 10D, an intermediate curve 68 of a circumference is obtained having the point light source $F_0$ as its center.

In all the cases, a rotary plane of the intermediate curve 68 about the z-axis is used as an intermediate curved surface 69. In the cases shown in FIGS. 10A and 10D, because of the characteristics of a rotary curved surface, light radiated from the point light source $F_0$ and reflected at the intermediate curved surface 69 reaches the cross point $F_2$. In the case shown in FIG. 10B, the reflected light propagates in parallel to the z-axis. In the case shown in FIG. 10C, the reflected light propagates along the straight line passing through the cross point $F_2$, becoming apart from the z-axis.

Figure 11:
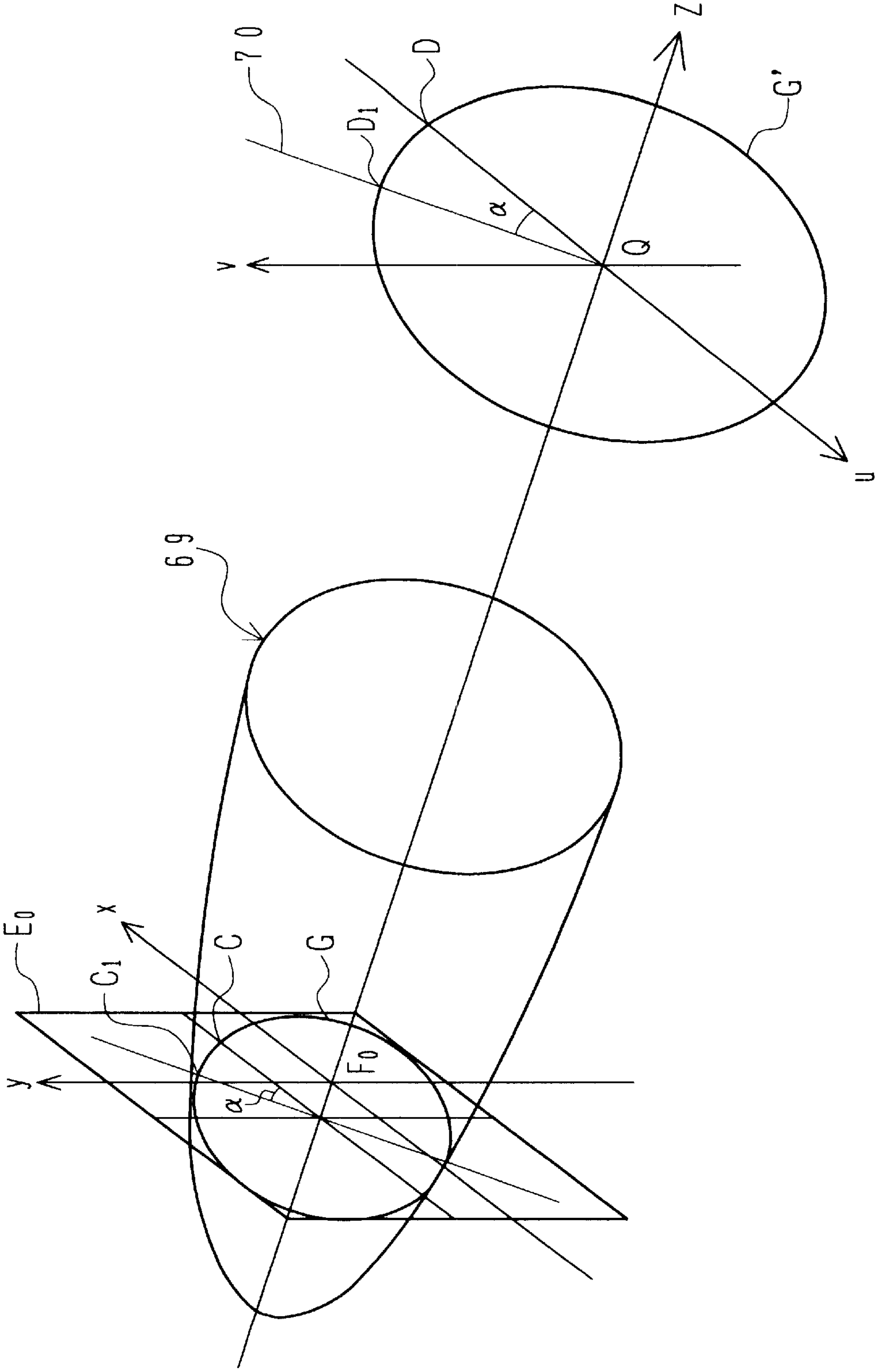
FIG. 11 is a perspective view illustrating a method of determining a rising area of a profile curve in the reflecting mirror manufacture method of the embodiment.

As shown in FIG. 11, a virtual plane $E_0$ is obtained which is vertical to the z-axis and passing through the sampling point C. A cross line G between the intermediate curved surface 69 and the virtual plane $E_0$ is obtained. The cross line G is a circumference in all cases shown in FIGS. 10A to 10D. A set of illumination points of light reflected on the cross line G forms a circumference G' passing through the illumination point D on the virtual screen.

The z-x plane is slanted about the z-axis by an angle a in a direction of raising the positive area of the x-axis. The angle a corresponds to the angle a between the light distribution boarder straight line 61 and u-axis shown in FIG. 8. A cross point $C_1$ is obtained between the plane (slanted plane) obtained by slanting the z-x plane by the angle a and the cross line G. An arc $CC_1$ is used as the profile curve for the sampling point C. A cross point $D_1$ is obtained between a plane obtained by slanting the z-x plane by the angle a and the circumference G'. As the reflection point moves along the profile curve $CC_1$ from the sampling point C to the cross point $C_1$, the illumination point of the reflected light moves along an arc $DD_1$ from the point D to the point $D_1$ on the virtual screen. Namely, as the reflection point moves becoming apart from the z-x plane, the illumination point also moves becoming apart from the z-x plane. The profile curve is obtained for each of all sampling points on the path line.

Next, a process of determining a reflecting surface making the illumination point of reflected light return on the virtual screen from the point $D_1$ to a point on the u-axis.

Figure 12:
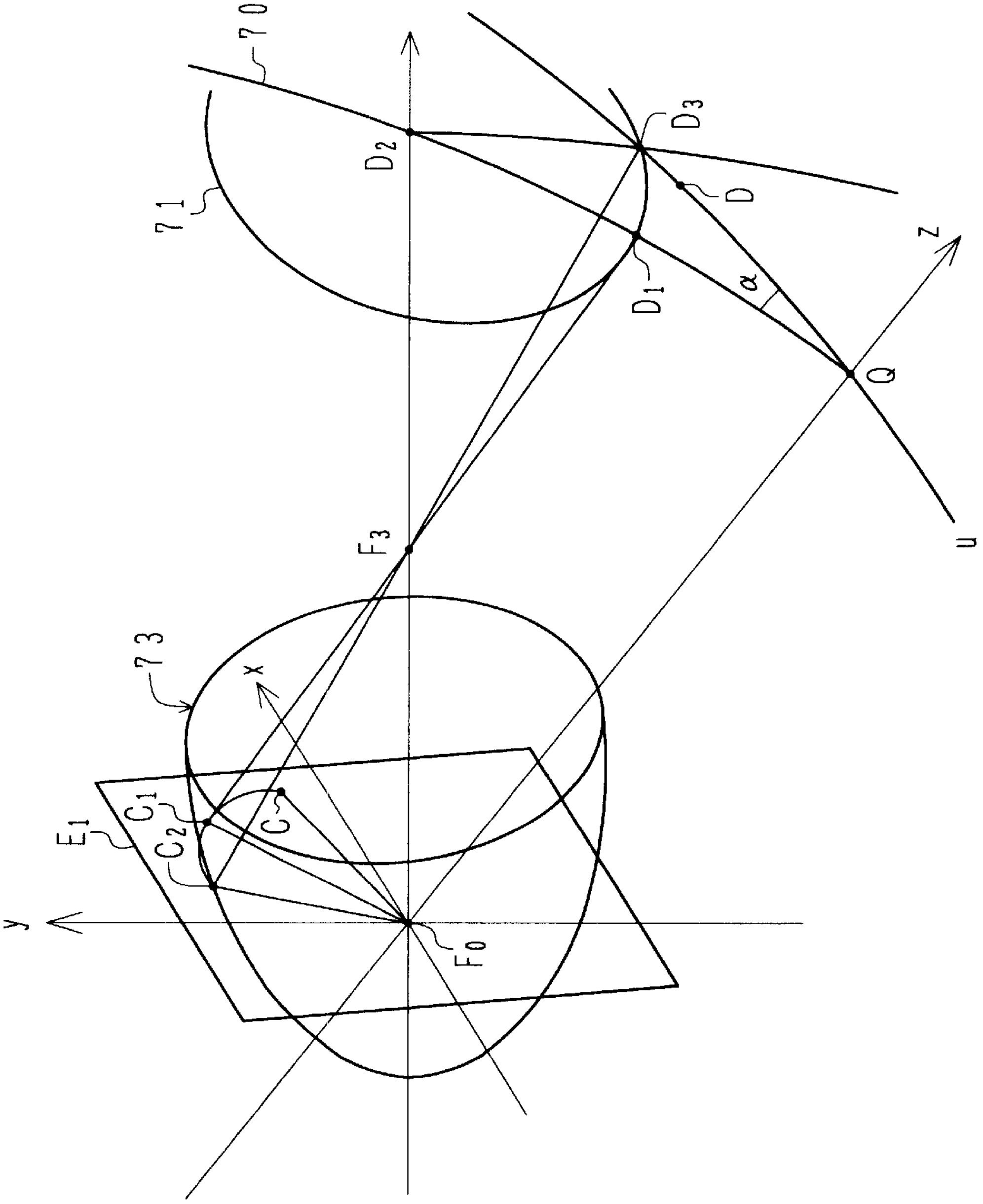
FIG. 12 is a perspective view illustrating a method of determining a return area of a profile curve in the reflecting mirror manufacture method of the embodiment.

As shown in FIG. 12, a cross line 70 is obtained between the plane (slanted plain) obtained by slanting the z-x plane by the angle a and the virtual screen. A point $D_2$ on the cross line 70 is determined. The point $D_2$ is more remotely positioned from the origin Q than the point $D_1$ shown in FIG. 11, and a circumference 71 having the point $D_2$ as its center and passing through the point $D_1$ crosses the u-axis. This cross point is used as a point $D_3$.

A cross point between a straight line $F_0D_2$ and a straight line $C_1D_1$ is represented by $F_3$. The points $F_0$, $C_1$, $D_1$, and $D_2$ are all positioned on the plane obtained by slanting the z-x plane by the angle $\alpha$. Therefore, the straight lines $F_0D_2$ and $C_1D_1$ will cross at one point. A rotary ellipse plane 73 is determined which has the points $F_0$ and $F_3$ as the focal points and passes through the point $C_1$. A plane $E_1$ is obtained which passes through the point $F_0$ and crosses the straight line $F_0D_2$ at a right angle. A cross line between the rotary ellipse plane 73 and the plane $E_1$ is a circumference. Light reflected at a reflection point on this circumference passes through the focal point $F_3$ and reaches a point on the circumference 71 on the virtual screen. A cross point between an extension of a straight line $D_3F_3$ and the plane $E_1$ is represented by $C_2$. This cross point $C_2$ is positioned on a cross line between the rotary ellipse plane 73 and the plane $E_1$.

An arc $C_1C_2$ is used as the profile curve. As the reflection point moves along the arc $C_1C_2$ from the point $C_1$ to the point $C_2$, the illumination point moves along the circumference 71 on the virtual screen from the point $D_1$ to the point $D_3$. Namely, as the reflection point moves becoming apart from the z-x plane, the illumination point moves becoming near to the z-x plane. The above process is executed for all sampling points C to obtain profile curves $CC_1$ and $C_1C_2$.

A spline blended surface is obtained from a plurality of profile curves $CC_1$ obtained for each sampling point and used as the reflecting surface. Similarly, a spline curved surface is obtained from a plurality of profile curves $C_1C_2$ obtained for each sampling point and used as the reflecting surface.

Figure 13:
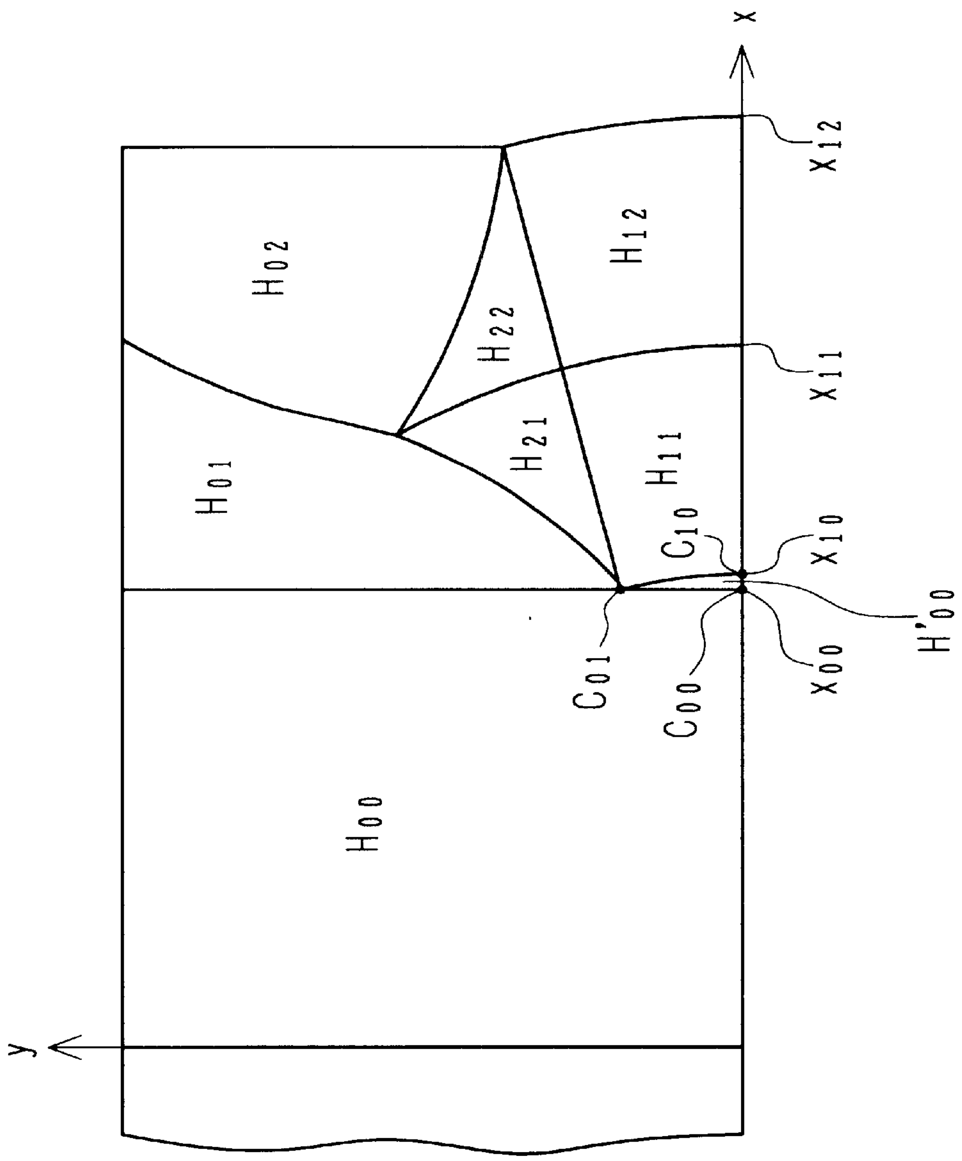
FIG. 13 is a schematic diagram showing the reflecting surface of a reflecting mirror manufactured by the embodiment method.

FIG. 13 is a front view showing an example of the reflecting surface obtained by the embodiment method. A reflecting area $H_{11}$ is determined from a plurality of profile curves obtained by the process illustrated in FIG. 11 for each of the plurality of sampling points from the x-coordinate $x_{10}$ to the x-coordinate $x_{11}$. A reflecting area $H_{12}$ is determined from a plurality of profile curves obtained by the process illustrated in FIG. 11 for each of the plurality of sampling points from the x-coordinate $x_{11}$ to the x-coordinate $x_{12}$. The x-coordinates $x_{10}$ to $x_{12}$ correspond to the x-coordinates $x_{10}$ to $x_{12}$ shown in FIGS. 9A and 9B.

In the reflection areas $H_{11}$ and $H_{12}$, as the reflection point moves in the upward direction (positive direction of the y-axis), the illumination point also moves in the upward direction (positive direction of the v-axis of the virtual screen). The reflection areas $H_{11}$, and $H_{12}$ are therefore called rising areas.

Reflection areas $H_{21}$ and $H_{22}$ are defined above the reflection areas $H_{11}$ and $H_{12}$. The reflection areas $H_{21}$ and $H_{22}$ are determined by the process illustrated in FIG. 12. In the reflection areas $H_{21}$ and $H_{22}$, as the reflection point moves in the upward direction, the illumination point moves in the downward direction. Namely, the illumination point returns near to the original position. The reflection areas $H_{21}$ and $H_{22}$ are therefore called return areas.

Reflection areas $H_{00}$, $H_{01}$ and $H_{02}$ are defined at the x-coordinate nearer to the center than the x-coordinate $x_{10}$ and above the return areas $H_{21}$ and $H_{22}$, by a method similar to the previously proposed method described with FIGS. 1 to 6. Light reflected in the reflection areas $H_{00}$ to $H_{02}$ illuminates the horizontal diffusion light distribution area 60 shown in FIG. 8.

A method of determining the reflecting surface in the border area between the rising area $H_{11}$ and the reflection area $H_{00}$ was not described above. The profile curve for the reflection area $H_{00}$ is determined by cutting the rotary ellipse plane by the virtual plane 7 as shown in FIG. 6. In contrast, the profile curve for the reflection area $H_{11}$ is determined by cutting the intermediate curved surface 69 by the plane $E_0$ as shown in FIG. 11. Since the directions of the cutting planes for determining the profile curves are different, the reflection area $H_{00}$ and rising area $H_{11}$ are not coupled smoothly. Next, a method of determining a reflection area $H_{00}'$ coupling the two areas smoothly will be described.

Figure 14A:
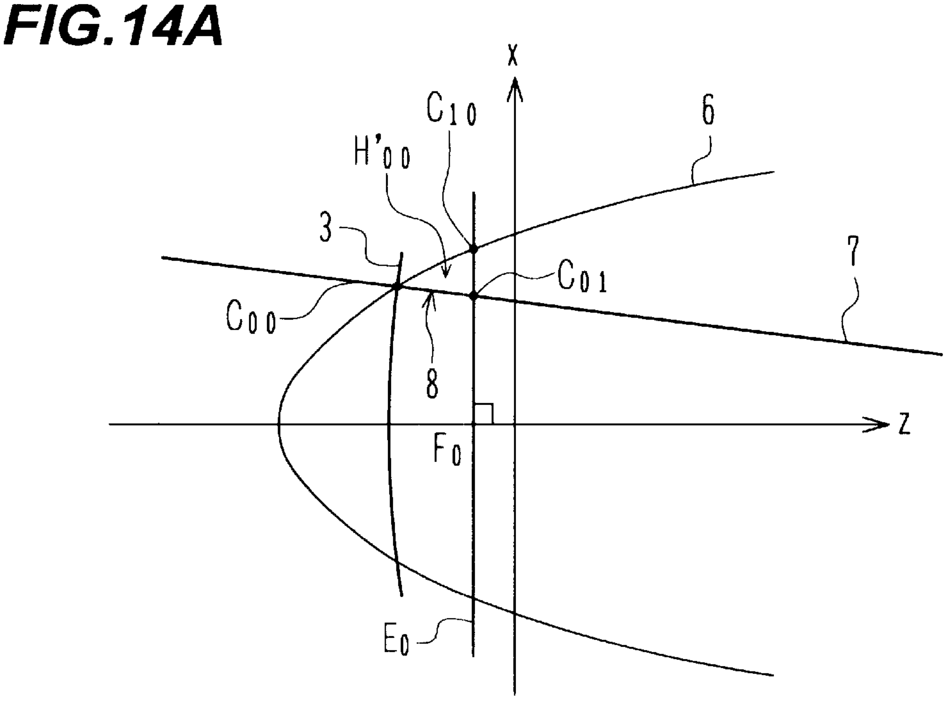
FIG. 14A is a diagram illustrating a method of determining a connection plane in the reflecting mirror manufacture method of the invention.

As shown in FIG. 14A, a profile curve is obtained by the process illustrated in FIG. 6 at a sampling point on the path curve 3. This sampling point is a point whereat a portion for illuminating the horizontal diffusion light distribution area switches to a portion for illuminating the vertical diffusion light distribution area, for example, the point $C_{00}$ having the x-coordinate $x_{10}$ shown in FIGS. 9A and 9B. Namely, the rotary ellipse plane 6 passing through the point $C_{00}$ is determined and a cross line between the virtual plane 7 and rotary ellipse plane 6 is used as the profile curve 8. The point $C_{00}$ shown in FIG. 14A corresponds to the point $C_{00}$ having the coordinates ($x_{00}$, 0) shown in FIG. 13.

Next, by using a method similar to the method illustrated in FIG. 11, the z-x plane is slanted about the z-axis by the angle a, and a cross point $C_{01}$ is obtained between the slanted plane and the profile curve 8. The cross point $C_{01}$ shown in FIG. 14A corresponds to the point $C_{01}$ where the reflection area $H_{00}$ and the rising area $H_{11}$ contact each other.

The description for this embodiment continues by reverting to FIG. 14A. The rotary ellipse plane 6 is cut with the plane $E_0$ being parallel to the Z-axis and passing through the point $C_{01}$. A cross point $C_{10}$ is obtained between this cut line and the z-x plane. The cross point $C_{10}$ shown in FIG. 14A corresponds to the point C10 having the coordinates ($x_{10}$, 0) shown in FIG. 13. An area $H_{00}'$ obtained by cutting the rotary ellipse plane 6 with the planes 7 and $E_0$ corresponds to the connection area $H_{00}'$ shown in FIG. 13.

As described with FIG. 11, the cut plane $E_0$ which is used for determining the profile curve for the rising area $H_{11}$ is perpendicular to the z-axis, similar to the cut plane $E_0$ described with FIG. 14A. Therefore, the border line of the connection area $H_{00}'$ on the rising area $H_{11}$ side and the border line of the rising area $H_{11}$ on the connection area $H_{00}'$ side are generally coincident so that a displacement amount becomes small and a step disappears. In this manner, the rising area $H_{11}$ can be connected smoothly to the connection area $H_{00}'$.

Figure 14B:
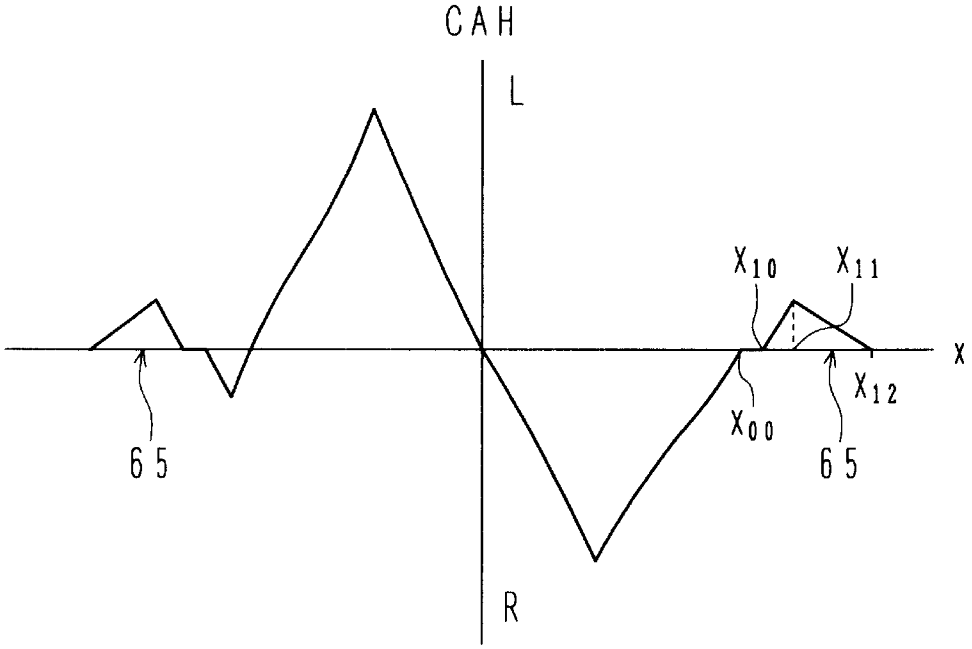
FIG. 14B is a graph showing a control curve with the connection plane being considered.

FIG. 14B shows the control curve CAH with the connection area $H_{00}'$ taken into consideration. An area of CAH=0 is formed from the x-coordinate $x_{00}$ to the x-coordinate $x_{10}$. This area corresponds to the connection area $H_{00}'$ (from the x-coordinate $x_{00}$ to the x-coordinate $x_{10}$) shown in FIG. 13. A position (point at $x=x_{10}$) outside the area of CAH=0 shown in FIG. 14B cannot be previously determined. The x-coordinate $x_{10}$ can be determined after the point $C_{10}$ is determined by the process described with FIG. 14A.

After the x-coordinate $x_{10}$ of the point $C_{10}$ is determined, the control curve for the vertical diffusion light distribution area outside the point $C_{10}$ can be determined.

In the above embodiments, the method of determining the reflecting surface for the vertical diffusion light distribution area for y>0 shown in FIG. 1 has been described. The reflecting surface for the vertical diffusion light distribution area for y<0 can be determined by a similar method. If the vertical diffusion light distribution area is to be disposed in the upper left area (u<0, v>0) on the virtual screen 50 shown in FIG. 1, the reflecting surface for the vertical diffusion light distribution area is disposed in an upper right (x>0, y>0) area and in a lower left (x<0, y<0) area as viewed from the front of the reflecting surface.

The present invention has been described in connection with the preferred embodiments. The invention is not limited only to the above embodiments. It is apparent that various modifications, improvements, combinations, and the like can be made by those skilled in the art.

What is claimed is:

1. A method of manufacturing a reflecting mirror for reflecting light radiated from a light source and illuminating a front space, comprising the steps of:

defining light distribution characteristics for defining a correspondence relation between: a position of a reflection point on a cross line between a reference plane and a reflecting surface of the reflecting mirror whose topological shape is to be determined, the reference plane cutting the reflecting surface and a virtual screen set in front of the reflecting mirror; and a position of an image of the light source projected upon the virtual screen by light radiated from the light source and reflected at the reflection point, the light distribution characteristics providing a feature that the image of the light source formed by the light reflected at the reflection point has some width on the virtual screen in a direction crossing the reference plane when the reflection point is positioned in a first area in a direction along the cross line between the reference plane and the reflecting surface;

determining in the reference plane a path line coincident with or approximate to the cross line between the reflecting surface and the reference plane, in accordance with the light distribution characteristics;

determining a profile curve for each of a plurality of sampling points dispersibly distributed on the path line, in accordance with the light distribution characteristics, the profile curve passing through the sampling point, corresponding to the topological shape of the reflecting surface, and providing a feature that when the sampling point is positioned in the first area, as the reflection point moves along the profile curve, the image of the light source moves in the direction crossing the reference plane in accordance with the light distribution characteristics; and determining the topological shape of the reflecting surface in accordance with the profile curve determined for each sampling point.

2. A method of manufacturing a reflecting mirror according to claim 1, wherein in an x-y-z orthogonal coordinate system, the reference plane is a z-x plane and the reflecting surface is directed in a positive direction of a z-axis, in a u-v orthogonal coordinate system, a u-axis is defined by a cross line between the virtual screen and the z-x plane and a v-axis is defined by a cross line between the virtual screen and a y-z plane, and the light distribution characteristics comprise:

a first relation defining a correspondence relation between: an x-coordinate representative of the reflection point; and a u-coordinate representative of a position of the image of the light source formed by the light reflected at the reflection point; and a second relation defining a correspondence relation between: the x-coordinate representative of the reflection point; and a v-coordinate representative of the position of the image of the light source formed by the light reflected at the reflection point.

3. A method of manufacturing a reflecting mirror according to claim 2, wherein:

when the reflection point is positioned outside the first area, a plurality of points in the u-v orthogonal coordinate system defined by the light distribution characteristics are distributed concentrating upon a cut-off line generally in parallel to the u-axis; and when the reflection point is positioned in the first area, a plurality of points in the u-v orthogonal coordinate system defined by the light distribution characteristics are distributed in a second area in the v-axis direction.

4. A method of manufacturing a reflecting mirror according to claim 2, wherein said step of determining the profile curve includes the steps of:

determining a rising portion of the profile curve providing a feature that as the reflection point moves along the profile curve, becoming apart from the z-x plane, an illumination point also moves becoming apart from the z-x plane; and determining a return portion of the profile curve providing a feature that as the reflection point moves along the profile curve, becoming apart from the z-x plane, the illumination point moves becoming near to the z-x plane.

5. A method of manufacturing a reflecting mirror according to claim 4, wherein said step of determining the rising portion comprises:

a first sub-step of obtaining the illumination point on the virtual screen in the reference plane, the illumination point corresponding to each sampling point in the first area on a basis of the light distribution characteristics;

a second sub-step of obtaining a first cross point between the z-axis and a straight line interconnecting the sampling point and a corresponding illumination point;

a third sub-step of obtaining an intermediate curved surface of: a rotary hyperbola plane having the position of the light source as a first focal point, the first cross point as a second focal point and passing through the sampling point, if a z-coordinate of the first cross point is smaller than the z-coordinate of the sampling point; a rotary ellipse plane having the position of the light source as a first focal point, the first cross point as a second focal point and passing through the sampling point, if the z-coordinate of the first cross point is larger than the z-coordinate of the sampling point; a sphere plane having the position of the light source as a center and passing through the sampling point if the first cross point is coincident with the position of the light source; or a rotary parabola plane having the position of the light source as a focal point, the z-axis as a center axis and passing through the sampling point, if the straight line interconnecting the sampling point and the corresponding illumination point is in parallel to the z-axis; and a fourth sub-step of determining the profile curve in accordance with the intermediate curved surface.

6. A method of manufacturing a reflecting mirror according to claim 5, wherein said fourth sub-step obtains the rising portion of the profile curve from a cross line between a plane perpendicular to the z-axis passing each sampling point and the intermediate curved surface.

7. A method of manufacturing a reflecting mirror according to claim 6, wherein:

when the reflection point is positioned in the first area, the illumination points distribute in an area between a positive or negative portion of a v-axis and a light distribution border straight line passing through an origin of the u-v orthogonal coordinate system and crossing the v-axis at a first angle; and said step of determining the rising portion determines as the rising portion a portion of the cross line between the plane perpendicular to the z-axis passing each sampling point and the intermediate curved surface cut with a z-x plane and a slanted plane including the z-axis and the light distribution boarder straight line.

8. A method of manufacturing a reflecting mirror according to claim 7, wherein said step of determining the return portion comprises the steps of:

determining a first point on the light distribution boarder straight line, the first point being remoter from the origin of the u-v orthogonal coordinate system than the illumination point of light reflected at an end point of the rising portion on the slanted plane side; and determining the return portion in accordance with a rotary ellipse plane having as a first focal point a cross point between: a straight line interconnecting the end point of the rising portion on the slanted plane side; and a straight line interconnecting the light source and the first cross point, as a second focal point the position of the light source and crossing the end point of the rising portion on the slanted plane side.

9. A lamp assembly comprising:

a light source; and a reflecting mirror for reflecting light radiated from said light source and illuminating a front space, wherein said reflecting mirror comprises a reflecting surface having a plurality of reflection areas;

wherein: in an x-y-z orthogonal coordinate system with a positive direction of a z-axis being set to a direction of the front space, the reflecting surface of said reflecting mirror is defined by an x-axis direction diffusion area, a y-axis direction rising area and a y-axis direction return area, said y-axis return area being adjacent to the y-axis rising area and disposed remoter from a z-x plane than the y-axis rising area; in the x-axis direction diffusion area, as a reflection point moves in an x-axis direction, an illumination point on a virtual screen facing the reflecting surface also moves in the x-axis direction, and as a reflection point moves in a y-axis direction, a y-coordinate of the illumination point on the virtual screen does not move; in the y-axis direction rising area, as the reflection point moves becoming remote from the z-x plane, the illumination point on the virtual screen also moves becoming remote from the z-x plane; and in the y-axis direction return area, as the reflection point moves becoming remote from the z-x plane, the illumination point on the virtual screen moves becoming near to the z-x plane.

10. A method of manufacturing a reflecting mirror for reflecting light radiated from a light source and illuminating a front space, said method comprising:

defining light distribution characteristics for defining a correspondence relation between: a position of a reflection point on a cross line between a reference plane and a reflecting surface of the reflecting mirror whose topological shape is to be determined, the reference plane cutting the reflecting surface and a virtual screen set in front of the reflecting mirror; and a position of an image of the light source projected upon the virtual screen by light radiated from the light source and reflected at the reflection point;

determining in the reference plane a path line coincident with or approximate to the cross line between the reflecting surface and the reference plane, in accordance with the light distribution characteristics;

determining a profile curve for each of a plurality of sampling points dispersibly distributed on the path line, in accordance with the light distribution characteristics, the profile curve passing through the sampling point, corresponding to the topological shape of the reflecting surface; and determining the topological shape of the reflecting surface in accordance with the profile curve determined for each sampling point.

11. A method of manufacturing a reflecting mirror according to claim 10, wherein in an x-y-z orthogonal coordinate system, the reference plane is a z-x plane and the reflecting surface is directed in a positive direction of a z-axis, in a u-v orthogonal coordinate system, a u-axis is defined by a cross line between the virtual screen and the z-x plane and a v-axis is defined by a cross line between the virtual screen and a y-z plane, and the light distribution characteristics comprise:

a first relation defining a correspondence relation between: an x-coordinate representative of the reflection point; and a u-coordinate representative of a position of the image of the light source formed by the light reflected at the reflection point; and a second relation defining a correspondence relation between: the x-coordinate representative of the reflection point; and a v-coordinate representative of the position of the image of the light source formed by the light reflected at the reflection point.

12. A method of manufacturing a reflecting mirror according to claim 10, determining the profile curve comprises:

determining a rotary ellipse for each sampling point, said rotary ellipse having a center of the light source as a first focal point and having a point on the u-v plane that is related to the sampling point by the light distribution characteristics as a second focal point; and defining a line on the rotary ellipse, passing through the sampling point, as the profile curve.

* * * * *